W. M. STEELE.
EMERY WHEEL DRESSER.
APPLICATION FILED JUNE 22, 1914.

1,290,395.

Patented Jan. 7, 1919.

Witnesses.
R. D. Tolman.
Penelope Cumberbach.

Inventor
William M. Steele.
By Fowler & Kennedy
Attorneys

UNITED STATES PATENT OFFICE.

WILLIAM M. STEELE, OF WORCESTER, MASSACHUSETTS.

EMERY-WHEEL DRESSER.

1,290,395.     Specification of Letters Patent.     Patented Jan. 7, 1919.

Application filed June 22, 1914. Serial No. 846,494.

*To all whom it may concern:*

Be it known that I, WILLIAM M. STEELE, a citizen of the United States, residing at Worcester, in the county of Worcester and Commonwealth of Massachusetts, have invented a new and useful Improvement in Emery-Wheel Dressers, of which the following, together with the accompanying drawing, is a specification.

My invention relates to emery wheel dressers and more particularly to an improved tool including a dressing wheel of suitable abrading material and means for holding the peripheral surface of the dressing wheel against an emery wheel for the purpose of dressing, evening and truing the working surface of the emery wheel.

One object of the invention is to provide a support and bearing for the dressing wheel so constructed that the wheel may be easily and quickly removed and replaced, or another wheel substituted, without interfering in any way with the adjustment of the bearing.

Another object of the invention is to provide an improved form of bearing for the dressing wheel.

Another object of the invention is to provide an improved form of handle with which the dressing wheel may be held against the working surface of an emery wheel which is to be dressed and trued.

Figure 1:
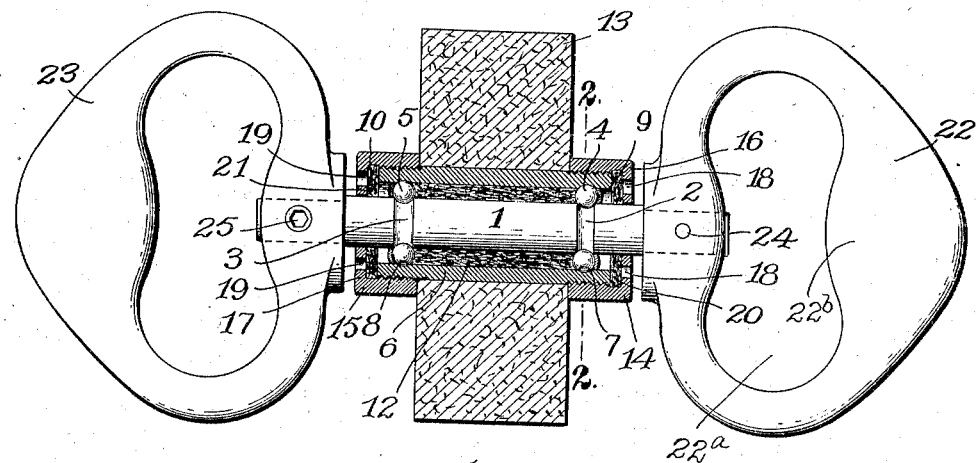
Figure 2:
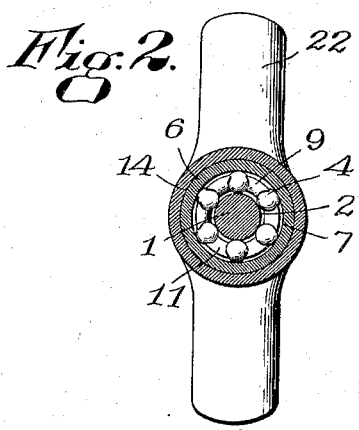
Figure 3:

Other objects and advantages will appear from the following description of one form of the invention taken in connection with the accompanying drawing, in which Figure 1 is a longitudinal sectional view of an emery wheel dresser constructed in accordance with the present invention; Fig. 2 is a sectional view on the line 2—2 of Fig. 1, looking away from the dressing wheel; and Fig. 3 is a view of the ball retainer used in each bearing for the purpose of spacing the balls.

Like reference characters refer to similar parts in the different figures.

In the form of the invention shown in the drawing, a cylindrical shaft or spindle 1 is provided with two spaced grooves 2 and 3 to receive the two sets of balls 4 and 5. A sleeve 6 surrounds the shaft 1 and the sets of balls 4 and 5 and is provided with internal grooves 7 and 8, the groove 7 being opposite the groove 2 so as to form an outer ball race for the set of balls 4 and the groove 8 being opposite the groove 3 so as to form an outer ball race for the set of balls 5. Similar ball retainers 9 and 10 serve to space the balls 4 and 5 equally about the axis of the shaft 1.

When the axis of the shaft 1 coincides with that of the sleeve 6, as it does when the shaft and sleeve are in their normal relative positions, the annular space between the shaft and sleeve is somewhat less than the diameter of the balls 4 and 5, the diameter of the balls being substantially equal to the distance between the inner and outer grooves. In assembling the bearing, a number of balls is placed in one of the internal grooves of the sleeve 6, the number of balls used being preferably sufficient to extend approximately half way around the groove, although it will be obvious that a lesser number may be used if desired. The shaft is inserted into the sleeve through the space between the balls and the other side of the sleeve until the proper groove on the shaft is opposite the balls. The shaft is next centered in the sleeve, the balls spaced equally around the shaft and the ball retainers 9 placed in position. The prongs 11 of the ball retainers are broadened at their free ends so that the space between the tips of two adjacent prongs is slightly less than that necessary for the passage of a ball. The prongs 11, however, are formed of elastic material so that they may be forced past the balls, the prongs yielding outwardly slightly as they pass the balls and then returning to their normal positions to hold the retainers in place. A ball bearing constructed in this way requires no groove to permit the insertion of the balls and it is obvious that it is not possible for any of the parts to get out of adjustment. The space between the two sets of balls may be filled with some suitable heavy lubricant 12, such as heavy grease or vaseline.

The dressing wheel 13 is fitted onto the sleeve 6 and is secured midway between the two ends of the sleeve by two caps 14 and 15 threaded onto the ends of the sleeve and screwed up tightly against the opposite faces of the wheel 13. The caps 14 and 15 have inturned end flanges 16 and 17 respectively which are provided with central openings for the shaft 1 and with small diametrically located openings 18 and 19 for the insertion of the prongs of a spanner wrench for the purpose of tightening or loosening the caps. The openings 18 and 19 serve also as oil holes. The length of the caps 14 and 15 is such as to leave small spaces between the ends of the sleeve 6 and the flanges 16 and 17 of the caps, felt washers 20 and 21 being provided in these spaces to exclude dust and to retain the lubricant.

Handles 22 and 23 are secured to the ends of the shaft 1. The handle 22 is secured to the shaft by a pin 24, but the handle 23 is secured to the shaft by a set screw 25 so that this handle may be easily removed when it is desired to remove the dressing wheel 13. Each handle is of peculiar shape, being formed in a closed curve lying in a plane passing through the axis of the shaft 1 and being considerably enlarged at that portion opposite its end of the shaft. Each handle is provided with an opening 22ª in which the fingers are placed, allowing the enlarged portion 22ᵇ of the handle to be seized by the palm of the hand. This form of handle in this class of tools is of great advantage as the fingers are partially inclosed in the opening 22ª and protected from contact with the revolving emery wheel which is being dressed, and the vibration of the tool is absorbed by the enlargement 22ᵇ which is firmly clasped in the hand of the operator. The handles are formed of heavy material such as cast iron or other heavy metal.

In dressing and truing the working surface of an emery wheel, the enlarged portions of the handles 22 and 23 are held in the palms of the hands and the periphery of the dressing wheel 13 is pressed against the emery wheel, the dressing wheel 13 being held at an angle to the plane of the emery wheel to cause a rubbing and grinding action between the two wheels as they roll upon each other. The enlarged portions of the handles not only fit comfortably into the palms of the hands, but they add greatly to the inertia of the device, thus tending to prevent vibration and liability of the dresser being suddenly thrown sidewise so as to cause the user's hand to strike the emery wheel. The sleeve 6 is shortened to provide spaces between the handles and the inturned flanges 16 and 17 for the admission of a spanner wrench and also for the insertion of the felt washers 20 and 21.

The dressing wheel may be replaced when desired by merely removing the handle 23 and the cap 15, none of the parts of the bearings being disturbed in any way.

While I have shown and described the details of one form of my invention, I do not wish to be limited to such details as it is obvious that certain changes may be made without departing from the spirit of the invention; but having described my invention, what I claim as new and desire to secure by Letters Patent is:

An emery wheel dresser, including a shaft, a sleeve mounted thereon, revoluble abrading means carried by said sleeve, a pair of handles carried by the ends of said shaft, said handles having openings to receive the fingers of the operator, and including an enlargement in alinement with the shaft and fitting the palm of the hand.

WILLIAM M. STEELE.

Witnesses:
PENELOPE COMBERBACH,
NELLIE WHALEN.